United States Patent
Kotsopoulos et al.

(10) Patent No.: US 7,031,176 B2
(45) Date of Patent: Apr. 18, 2006

(54) INVERTER

(75) Inventors: Andrew Kotsopoulos, Eindhoven (NL); Machiel Antonius Martinus Hendrix, Eindhoven (NL); Jorge Luiz Duarte, Maastricht (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/521,181

(22) PCT Filed: Jun. 25, 2003

(86) PCT No.: PCT/IB03/02722

§ 371 (c)(1),
(2), (4) Date: Jan. 14, 2005

(87) PCT Pub. No.: WO2004/008619

PCT Pub. Date: Jan. 22, 2004

(65) Prior Publication Data

US 2005/0226017 A1   Oct. 13, 2005

(30) Foreign Application Priority Data

Jul. 15, 2002  (EP) .............................. 02077843

(51) Int. Cl.
*H02M 7/5387* (2006.01)
(52) U.S. Cl. ....................................... 363/131
(58) Field of Classification Search ............. 363/40, 363/95, 97, 131
See application file for complete search history.

(56) References Cited

U.S. PATENT DOCUMENTS

| 4,494,180 | A | * | 1/1985 | Streater et al. | ............... 363/37 |
| 5,235,266 | A | * | 8/1993 | Schaffrin | ................... 323/205 |
| 6,525,507 | B1 | * | 2/2003 | Ganz | .......................... 320/101 |
| 6,678,174 | B1 | * | 1/2004 | Suzui et al. | ................... 363/55 |

* cited by examiner

*Primary Examiner*—Adolf Berhane

(57) ABSTRACT

In a system for the conversion between DC power and AC power, including a buffercapacitor and a controllable converting arrangement, said conversion is controlled by a power control quantity that in turn depends on a first component assuring a balance between DC power and AC power and a second component indicating a change in energy stored in the buffer capacitor on a predetermined sampling time instant in the cycle of the voltage ripple on the buffer capacitor.

4 Claims, 4 Drawing Sheets

INVERTER

The invention in its general aspects relates to a system for the conversion between direct current (DC) power and single phase alternating current (AC) power in either direction.

In particular the invention relates to the conversion of the DC power of solar or photovoltaic (PV) cells to AC power for direct supply into an electrical mains distribution system or grid system but is also applicable to the conversion of AC power in DC power in controlled rectifier applications.

A system of the aforementioned kind is known e.g. from U.S. Pat. No. 4,494,180 wherein the load is formed by a synchronous motor.

The latter system is comprised of a DC/DC converting arrangement or converter, a DC link and a DC/AC inverting arrangement or inverter in tandem, whereby the DC link includes a parallel connected capacitor which acts as an intermediate temporary energy storage element or buffer. A DC source, a solar or PV array in this case, is connected to the converter input terminals and a load, a synchronous motor in this case, is connected to the inverter AC output terminals and the inverter output terminals are connected to the inverter DC input terminals by way of the mentioned DC link including the buffer capacitor.

The converter is generally used to boost the level of the DC voltage of the DC source to a level comparable to that which is required to drive the AC load. Another known possibility is to connect the DC source directly to the DC input terminals of an inverter and to boost the AC output voltage thereof to the level required by the AC load by means of an AC transformer. For the invention it is irrelevant which system is used, and the former will be used only for the purpose of illustration.

An inherent problem of single-phase inverters is that they deliver a pulsating power to the load. When the voltage and current vary sinusoidally the resulting power is the sum of an average DC component plus a sinusoidal component of twice the AC frequency, i.e.:

$$v_{ac}(t) = V \cos(\omega_{ac} t) \quad (1)$$

and $$i_{ac}(t) = I \cos(\omega_{ac} t) \quad (2)$$

then $$p_{ac}(t) = v_{ac}(t) \cdot i_{ac}(t)$$
$$= VI \cos^2(\omega_{ac} t)$$
$$= \frac{VI}{2}(1 - \cos(2\omega_{ac} t))$$

where
$v_{ac}(t)$ is the time varying AC voltage of peak magnitude V and angular frequency $\omega_{ac}$
$i_{ac}(t)$ is the time varying AC current with peak magnitude I
$p_{ac}(t)$ is the time varying power.

In practice, a voltage-source inverter (VSI) is fed by a non-ideal voltage source; the source might have a significant impedance, or contain AC current or voltage components. PV arrays, for instance, have a non-linear output characteristic in which the output voltage depends on current. Therefore, the ability of a practical source to supply the double frequency power ripple component is limited. The problem manifests itself as a voltage ripple on the inverter DC terminals. This voltage ripple can then appear as undesirable harmonic distortion on the AC output.

Another problem in the case of PV-grid inverters occurs when the PV array is supplying the ripple power, or some fraction of the ripple power. The maximum power point is a unique set of voltage, current, and power, for a given set of irradiance and temperature conditions. A ripple component implies operation away from the maximum power point, therefore the array does not convert as much solar energy as is potentially available.

Normally, a large capacitance can be placed at the DC input to the inverter to filter any ripple entering from the source, and to act as an energy buffer to supply the double frequency power. With infinite capacitance, the source supplies only the average DC component. There is a trade off between the size of the capacitance, voltage ripple on the DC terminals, and the power ripple drawn from the source.

As mentioned above, it is particularly important that the PV array supplies only the average DC component of power to the inverter DC link. If there is any voltage ripple present, then there must be a current and power ripple also. When this is the case, the array is not operating continuously at its maximum power point, and the efficiency of the system is reduced.

The object of the invention is to allow the array to be operated at constant power and at its maximum power point, with no double frequency voltage or current ripple and to achieve this with a finite capacitance in the DC input to the inverter. The value of the capacitance is significantly smaller than what would conventionally be required for the suppression of ripple in the DC input, and harmonic distortion in the AC output.

There is a minimum energy storage requirement in order to supply the ripple power and this comes from the DC link capacitor. The energy stored in a capacitor is $$E_{dc} = \frac{1}{2} C_{dc} v_{dc}^2 \quad (4)$$

therefore using small capacitor results in a large voltage ripple and higher peak DC voltage than what is conventionally used.

According to the invention a particular predictive power control quantity is formed for the inverter, which can be a state of the art inverter having a power control input for receiving thereon a power control signal to regulate the AC power that is supplied to the load, whereby the predictive control quantity in addition to a component which assures DC-AC power balance between the DC power delivered by the source and the AC power delivered to the load, according to the invention also comprises a component which is indicative of a change in energy that is stored in the buffer capacitor on a selected sampling time instant in the cycle of the double frequency voltage ripple component on the buffer capacitor, compared with a predetermined amount of energy, which particular predictive power control quantity may as will be shown hereinafter be expressed by: $p_{inv21} = p_{dc} - f_{ac} C_{dc} (v_{ref}^2 - v_{dc1}^2)$, wherein $p_{inv21}$ is the power to the inverter during the sampling period, p the power delivered by the DC-DC converter, $f_{ac}$ the frequency of the AC grid system, $C_{dc}$ is the capacitance of the buffer capacitor, $v_{ref}$ is a reference voltage and $v_{dc1}$ is the voltage on the buffer capacitor on the sampling instant, whereby the sampling instant may be chosen in a point (phase) of the cycle of the ripple voltage where the ripple voltage is at its minimum, its maximum or has its average value.

By so controlling the inverter with the predictive power control quantity according to the invention it can be assured that the ripple voltage on the buffer capacitor can be kept at a selected minimum value, a selected maximum value or at a selected average value and by combining forward control quantities taken at different sampling time instant it can be assured that the ripple voltage stays within a specified range.

The invention will now be explained in more detail hereinafter under reference to the accompanying drawing wherein:

FIG. 1(a) and FIG. 1(b) show basis arrangements for the conversion of DC power into AC power, referred to above, having each a DC source DC-SO, an inverter INV, an AC load AC-LO and respectively a transformer TR and converter CO, as shown.

Figure 1A:
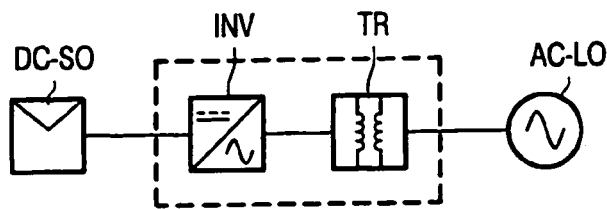
Figure 1B:
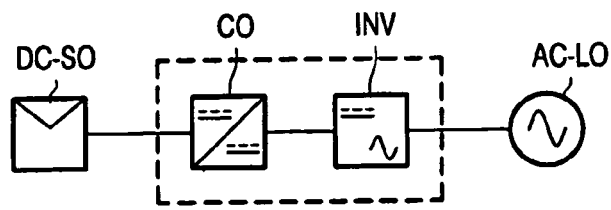
Figure 2:
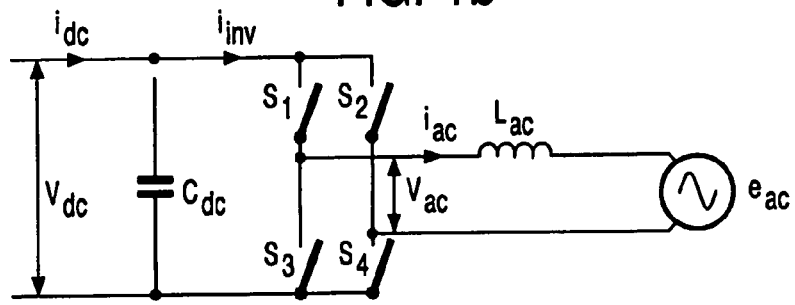
FIG. 2 shows a diagram of a voltage-source inverter, with a buffer capacitor $C_{dc}$, controlled switches S1–S4, a filter $L_{ac}$ and an AC load $e_{ac}$.

Generally, under reference to FIGS. 1 and 2 the inverter is used to change the input DC voltage to an output AC voltage with controlled magnitude and frequency. The most commonly used topology is the voltage-source-inverter (VSI), shown in FIG. 2. Many of the PV inverters available at present use a line transformer to match the magnitude of the array voltage to the grid, as in FIG. 1(a). For this case the output of the inverter is generally significantly lower than the grid magnitude, and the transformer steps it up to the grid level. Also, as the array is connected directly to the inverter input, the inverter control system will normally regulate the PV power flow in order to extract the maximum energy from the array. This technique is referred to as maximum power point tracking (MPPT).

When preceded by a DC-DC converter, as in FIG. 1(b), the inverter connects directly to the grid, and its output magnitude is close to the grid voltage; the grid and inverter frequencies are the same, but there is small phase shift between the inverter and grid voltage which depends on the power flow. The use of an intermediate DC-DC converter can avoid the substantial weight of the line transformer. If isolation is required then a DC-DC converter circuit employing a high-frequency transformer can be used, and this transformer is significantly smaller and lighter. The DC-DC converter will normally perform the MPPT function.

The proposed approach according the invention uses the topology shown in FIG. 1(b) with a DC-DC converter to provide voltage step up from the level of the array to a level suitable for the inverter to operate into the grid. The DC link between the inverter and DC-DC converter has a relatively small capacitance compared with conventional inverters.

For a given power throughput, the pulsating power component is always the same, and will be supplied entirely from the DC capacitor. However, with a significantly smaller capacitor than what is conventionally used, a large ripple and higher peak DC voltage results. Recognizing that the energy stored in a capacitor varies according with the square of voltage, for the same energy transfer, the size of capacitor is traded off against the peak voltage appearing on the DC link.

A control mechanism responds at a high speed to maintain sinusoidal current in the AC output, in the presence of the large DC bus ripple. The envelope of the DC voltage must be constrained within safe operating limits. This is achieved according to the invention by controlling the power flow through the inverter in order to balance the incoming power from the PV array, and also to regulate the energy stored in the DC capacitor. By balancing the incoming energy, the energy stored in the capacitor, and the energy exported to the grid, the DC voltage envelope can be kept within the desired range. The control technique according to the invention to achieve this objective is described in more detail hereinafter.

A specific benefit of having a small capacitance in the DC link is that a non-electrolytic type can be employed without a significant penalty in terms of cost or volume. Since the electrolytic capacitors commonly used as DC link storage elements are often the limiting components for inverter longevity, it is expected that reliability and lifetime can be significantly improved. Furthermore, the electrolytic capacitor also constrains the inverter operating temperature because its lifetime and reliability are particularly sensitive to temperature. Avoiding the use of this type of capacitor extends the boundary imposed by reliability and operating temperature, and provides a degree of freedom with respect to cooling, packaging, and the location of the inverter when it is operating.

Furthermore, in this embodiment the separate DC-DC converter serves to decouple the DC link from the array. It is intended to operate at the array maximum power point, with constant voltage and current at its input. At its output, it delivers constant power into the DC link, while the voltage is allowed to vary over a wide operating range due to the double-line-frequency ripple. Thus, the converter achieves the voltage level transformation, avoids the pulsating power in the arrays, and operates the array at maximum power point.

The DC-DC converter can also be realized using a topology employing a compact high-frequency transformer if galvanic isolation is required. This results in a smaller and lighter system when compared with using a line-frequency transformer. Also, multiple DC-DC converters can be operated in parallel which provides a degree of modularity and expandability. The array can be split into groups of panels of arbitrary size, and each group is controlled to operate at its maximum power point.

Figure 3:
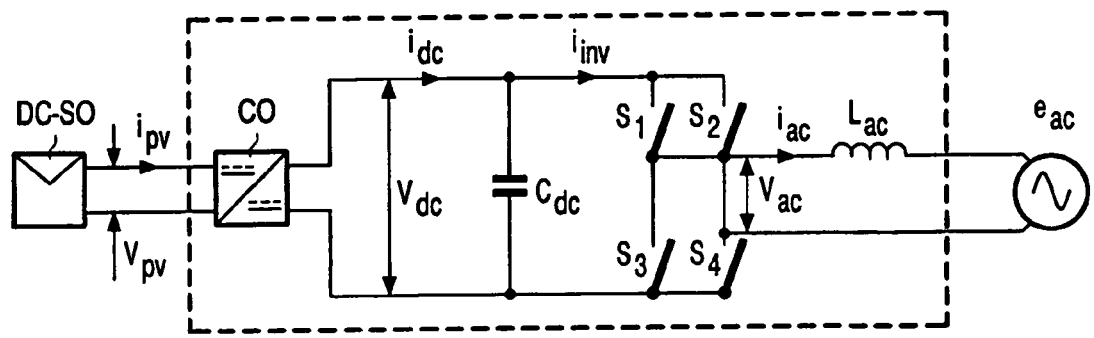
FIG. 3 shows the inverter of FIG. 2 incorporated in a system for the conversion of DC power of the source DC-SO into single phase AC power in the load $e_{ac}$

The advantages of the proposed mode of operation and the overall system topology are summarized as follows:
small DC link capacitor
DC link ripple components do not contribute to harmonic distortion in the AC output
controlled DC link voltage
fixed PWM switching frequency
AC voltage and current spectrum equivalent to asymmetric regularly sampled PWM
AC current control with rapid transient response
unity power factor operation low output distortion
maximum power point tracking
flexible configuration of the array
potential to expand the system by adding panels and parallel DC-DC converters The circuit topology for the proposed PV-grid power conversion system is shown in FIG. 3. The topology of the DC-DC converter is not specified. There are many suitable DC-DC converter topologies that have been reported in the literature, and which are in common use.

Figure 4:
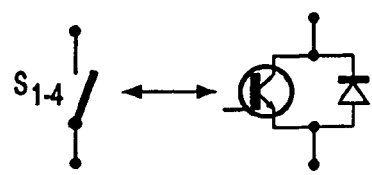
FIG. 4 shows an electronic circuit diagram for the switches in FIGS. 2 and 3.

The choice of a particular circuit depends on the following factors:
power rating
necessity for galvanic isolation
input and output voltage levels
level of performance required The inverter is a conventional VSI with four switches S1–S4. The switches are semiconductor devices such as MOSFETs or IGBTs together with an anti-parallel diode as shown in FIG. 4.

The switches are controlled by pulse width modulation (PWM) switching signals as is common practice.

The requirement in this embodiment is that the DC-DC converter can be operated in a control mode where $v_{dc}$ is an independent quantity, while one of $i_{dc}$, $i_{pv}$ or $v_{pv}$ is controlled to regulate the power flow. Only one of these quantities needs to be controlled, and then the others are constrained by the input-output power balance, and the voltage-current characteristic of the PV array.

Normally the converter switching frequency is significantly higher than the output AC frequency. Also, the transient response of the current regulation is much faster than the period of a fundamental AC cycle ($1/f_{ac}$). Therefore, it is valid to consider the inverter as having continuous input and output waveforms. The energy balance between the DC input, AC output, and energy stored in the DC link capacitor is given by the following equations:

$$p_{dc} = v_{dc} i_{dc} \quad (5)$$

$$v_{dc} = \frac{1}{C_{dc}} \int (i_{dc} - i_{inv}) dt \quad (6)$$

$$p_{ac} = v_{ac} i_{ac} \quad (7)$$

$$p_{ac} \approx p_{dc} \quad (8)$$

where:
$p_{dc}$ is the power delivered by the MPPT DC-DC converter.

The power from the array changes relatively slowly, so this is approximately constant over the period of a fundamental AC cycle;

$p_{ac}$ is the inverter AC power, which is approximately equal to the input power;

$v_{dc}$ is the DC link voltage. Since $C_{dc}$ is relatively small compared with conventional inverters, there will be a significant double frequency ripple component (at $2f_{ac}$);

$i_{dc}$ is the current out of the MPPT DC-DC converter entering the inverter DC link. Since the DC-DC converter is operating at constant power, the ripple in $V_{dc}$ results in a ripple in $i_{dc}$;

$i_{ac}$ is the inverter AC current;

$i_{inv}$ is the average current entering the inverter bridge, namely the difference between the input current, $i_{dc}$, and the current entering the capacitor;

$v_{ac}$ is the average voltage on the inverter AC terminals. $v_{ac}$ and $i_{inv}$ are averaged over a PWM switching time.

Figure 5:
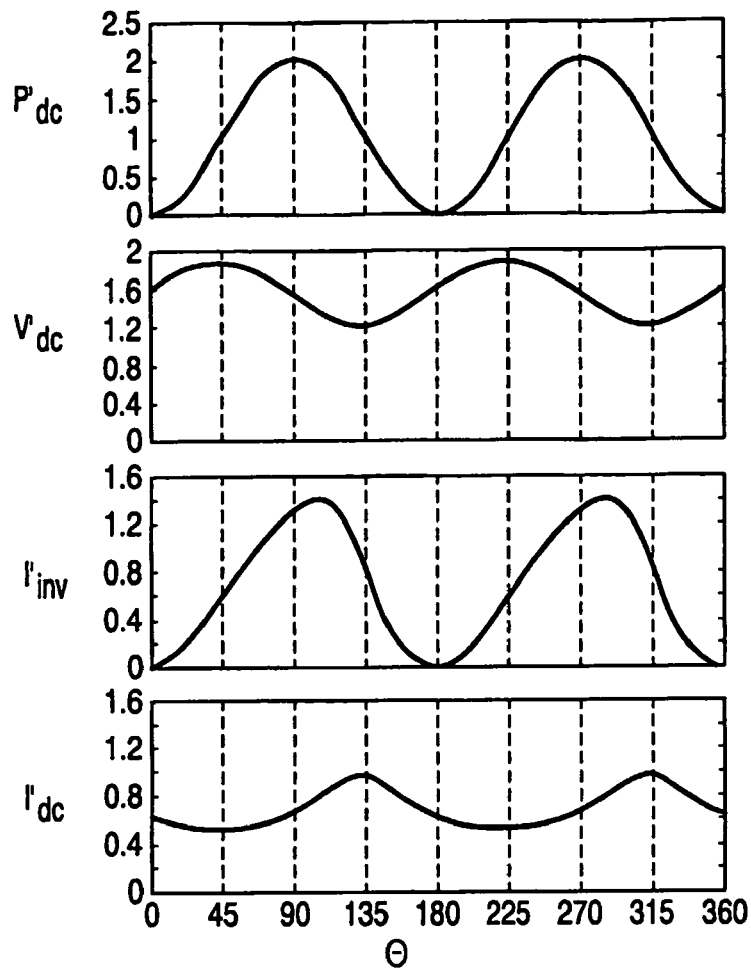
FIG. 5 shows diagrams of normalized power, voltage and current quantities in the circuit of FIG. 3 as a function of the phase θ (in degrees) in a cycle of the AC voltage to the load.

FIG. 5 shows the DC link waveforms when the inverter is operating at unity power factor output. The independent axis is the phase angle θ, where $θ=2πf_{ac}t$. The dependant variables have been normalized as follows:

$$p'_{ac} = p_{ac}/P_{ac}$$

$$v'_{dc} = v_{dc}/\sqrt{2}E_{ac}^2$$

$$i'_{dc} = i_{dc}/I_{base}$$

$$I'_{inv} = i_{inv}/I_{base}$$

where
$P_{ac}$ is the nominal inverter AC power
$E_{ac}$ is the nominal RMS voltage of the grid
and $$I_{base} = P_{ac}/(E_{ac}\sqrt{2})$$

A base value for the DC capacitor, $C'_{dc}$, is also determined from:

$$Y_{base} = P_{ac}/(\sqrt{2}E_{ac}^2)$$

$$=> 2\pi f_{ac} C_{base} = P_{ac}/(\sqrt{2}E_{ac}^2)$$

$$=> C_{base} = P_{ac}/(4\pi f_{ac} E_{ac}^2)$$

so $$C'_{dc} = C_{dc}/C_{base}$$

where:
$Y_{base}$ is the base admittance
$C_{base}$ is the base capacitance

FIG. 5 illustrates how for sinusoidal output voltage and current, $p'_{ac}$ varies between zero and twice the nominal output with a frequency $2f_{ac}$. The DC capacitor value $C'_{dc}$ is 1, which is relatively small compared with conventional inverter applications. $v'_{dc}$ has a substantial $2f_{ac}$ ripple component, as well as other harmonic components. Note that $v'_{dc}$ should always be greater than 1 to avoid over-modulation, while the maximum value is limited by the voltage rating of the converter components. $i_{inv}$ and $i_{dc}$ also have substantial harmonic components.

Figure 6:
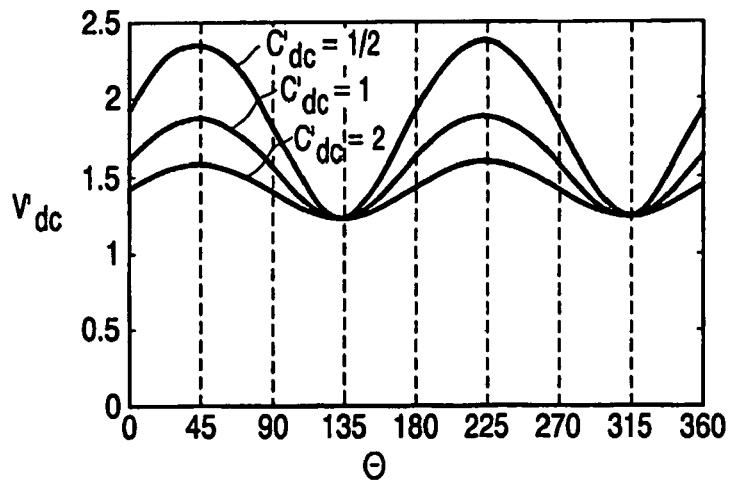
FIG. 6 shows diagrams of normalized ripple voltage for different normalized values of the capacitance of the buffer capacitor.

FIG. 6 shows the effect of varying the capacitance on the DC voltage envelope while operating at rated power. The peak-to-peak magnitude of the voltage ripple increases with decreasing capacitance. In this figure a minimum level of $v'_{dc}=1.2$ for the voltage envelope is specified in order to avoid over-modulation. As a result, decreasing the value of capacitance increases the maximum of the envelope. An alternative approach would be to specify a maximum voltage level which is some percentage of the semiconductor switch voltage ratings. Then, the minimum of the envelope will be lower for smaller values of capacitance.

When the average input power equals the average output power, not taking losses into account for the present, the average DC capacitor voltage is constant, and the ripple is periodic. That is:

$$v_{dc}(\theta) = v_{dc}(\theta + n\pi) \quad (9)$$

where:
n is an integer.

Thus, because the ripple voltage is synchronous with the inverter output, the maximum DC voltage can be tracked at points near the angles $θ=π/4$ and $θ=5π/4$. The minimum is near 3π/4 and 7π/4. For small ripple, the average voltage occurs near zero, π, and 2π. However, the energy stored in the capacitor is non-linear with respect to voltage so for large voltage swings these angles are not where the average voltage occurs.

The aim of the control technique is to regulate the DC voltage while simultaneously producing a controlled AC current with no low-order distortion (i.e.: harmonics of $f_{ac}$). Since the DC voltage is expected to have a large ripple component, the 30 peaks of the voltage should be within a safe operating range, and the ripple should not contribute to distortion in the AC waveforms.

The average input power will only equal the output power in steady state operation. Normally, the power from the PV array is varying continuously, and disturbances on the grid or variations in the grid voltage will affect the power balance. Furthermore, converter losses represent a constant disturbance to the overall control scheme. This imbalance will result in the DC capacitor voltage drifting away from the desired level.

A convenient point to sample the DC voltage is for angles θ=0, π, 2π, etc. Thus the voltage sampling interval is defined as the period between these samples, which is $1/(2f_{ac})$. The control mechanism should operate so that the sampled voltage at these points equals a reference value $v_{ref}$. $v_{ref}$ should be chosen taking into account the expected voltage ripple under full load conditions, so that the maximum and minimum levels are not outside the safe operating range.

The sampled voltage is made to follow $v_{ref}$ by regulating the AC power. The following equation describes the energy balance for the DC capacitor between two sample times:

$$E_{dc21} - E_{inv21} = \frac{1}{2} C_{dc}(v_{dc2}^2 - v_{dc1}^2) \quad (10)$$

where:
$E_{dc21}$ is the energy delivered to the DC link by the DC-DC converter during the sample period;
$E_{inv21}$ is the energy supplied to the inverter input, and it is assumed that the inverter is lossless and its input and output power are equal;
$v_{dc1}$ and $v_{dc2}$ are the voltages at each of the sample times.

Since the PV input power ($p_{dc}$) changes slowly compared with the voltage sample period, the energy delivered during this time is:

$$E_{dc21} = \frac{p_{dc}}{2f_{ac}} \quad (11)$$

If the measured voltage deviates from the reference ($v_{ref}$) then this can be corrected during the next sample period by modifying the power balance so that $v_{dc2}=v_{ref}$ as follows:

from equ. (10) (12)

$$E_{inv21} = E_{dc21} - \frac{1}{2} C_{dc}(V_{ref}^2 - v_{dc1}^2)$$

$$\Rightarrow \frac{p_{inv21}}{2f_{ac}} - \frac{1}{2} C_{dc}(V_{ref}^2 - v_{dc1}^2)$$

$$\Rightarrow p_{inv21} = p_{dc} - f_{ac} C_{dc}(V_{ref}^2 - v_{dc1}^2)$$

where
$p_{inv21}$ is the power to the inverter during the sample period.

The power term has two components: one $p_{dc}$) achieves the DC-AC power balance, while the other corrects the voltage error. The error in power balance caused by losses in the system results in a steady state energy error, which is related to the steady state DC voltage error.

The inverter power ($p_{inv}$) is regulated by controlling the magnitude and phase of the AC current that is fed into the grid.

FIG. 5 shows characteristic waveforms for the DC link quantities. For control purposes the DC voltage $v_{dc}$ can be sampled at its maxima and/or minima, that is at angles 45°, 135°, 215° and 315°.

For normal operation the DC voltage is constrained by an upper and lower value. The minimum is $\sqrt{2}E_{ac}$ which is the peak AC voltage. Below this voltage level the PWM inverter control goes into overmodulation which results in increased harmonic distortion in the AC output, and eventually a loss of control. The upper voltage limit is constrained by the maximum safe operating voltage of all the semiconductor devices and DC link components.

There are three basic options for setting the level of the target DC voltage:

control the minimum of the voltage ripple;

control the maximum;

combination of both.

Controlling the Minimum Level

Figure 7:
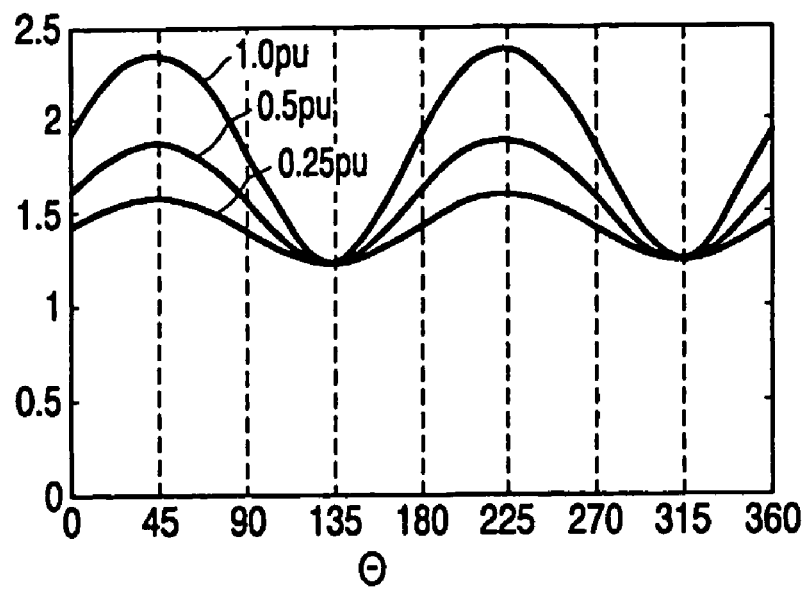
FIGS. 7 and 8 show diagrams of normalized ripple voltage with forward control on the minimum and maximum respectively for various power levels.

When controlling the minimum level of the DC voltage envelope it is only necessary to measure the voltage minima. These points are then regulated to be near $\sqrt{2}E_{ac}$, allowing for a practical safety margin. The magnitude of the voltage ripple depends on the power output and size of the DC capacitor, therefore the maxima will reach some predictable level, as shown in FIG. 7.

Controlling the Maximum Level

Figure 8:
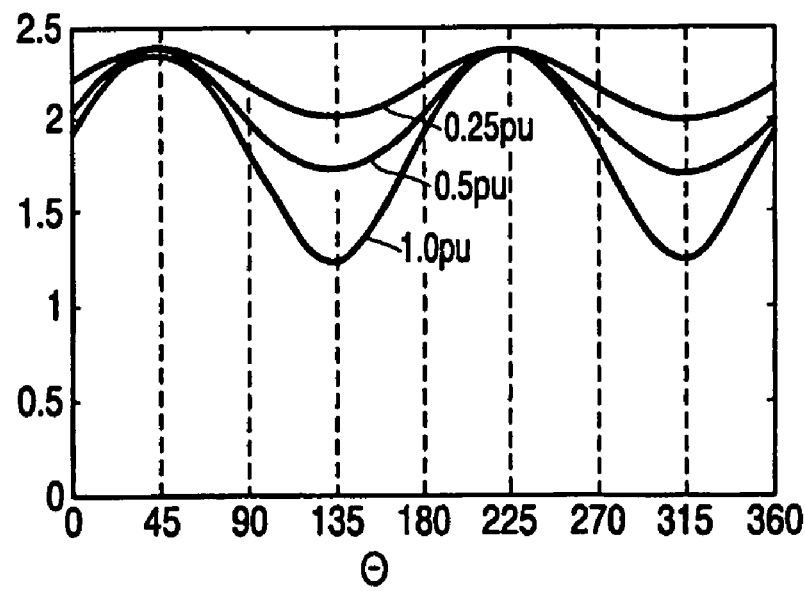

FIG. 8 illustrates control of the voltage maxima. For this case only the maxima are measured and the level is set according to the maximum safe operating voltage.

Controlling the Minimum/Maximum Level

The most general case allows for regulation of both minima and maxima, and therefore requires measurement of both. Using this technique, the voltage envelope can be controlled to be anywhere within the safe operating range. Two general options include:

1. setting the envelope to have an average value at a fixed level at or near the middle of the safe range, or at some optimal operating point;
2. dynamically changing the position of the envelope according to the load conditions.

Figure 9:
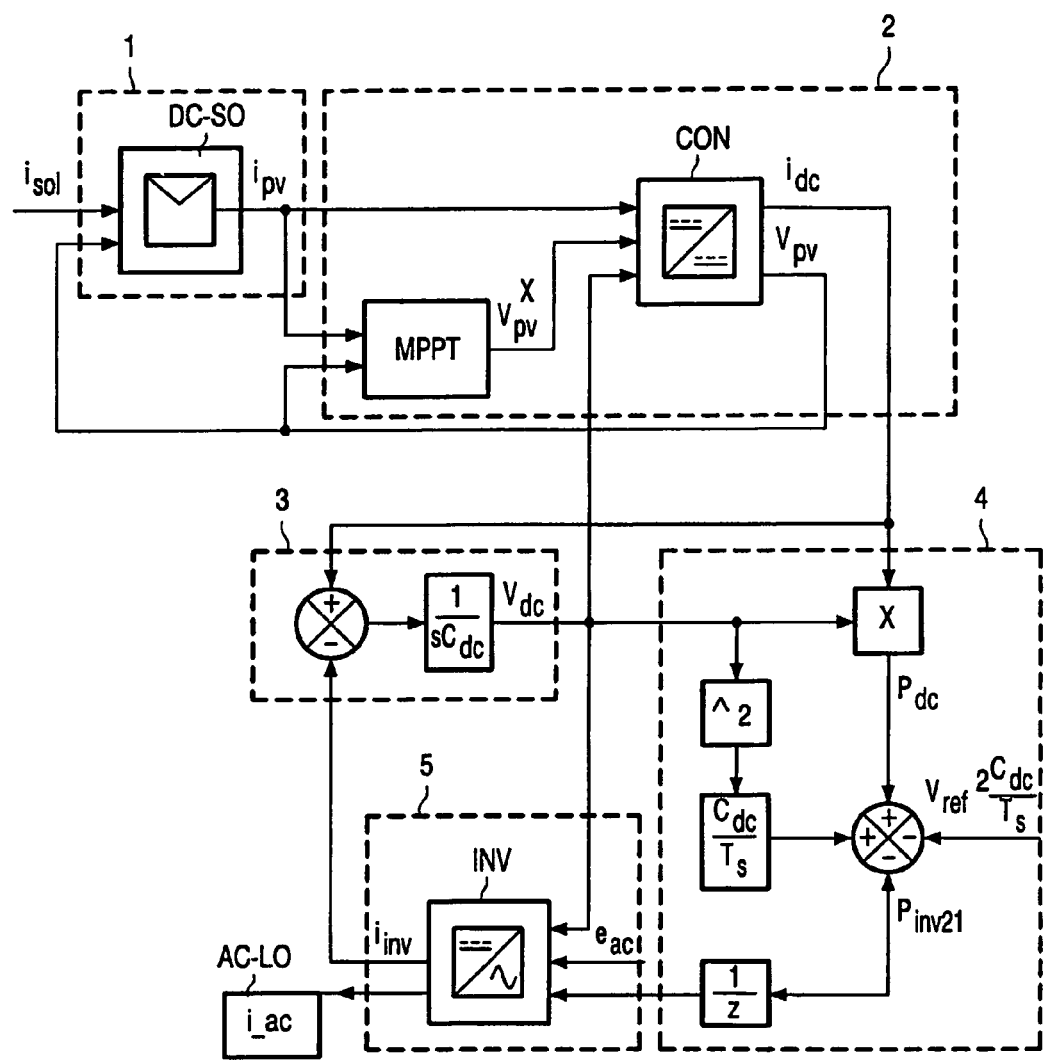
FIG. 9 shows a functional representation of the system of FIG. 3 embodying the invention.

FIG. 9 shows the flow of control information c.q. signals in a DC-AC power conversion system of the general type shown in FIG. 1(b), which system comprises a DC source (PV array) DC-SO, a DC-DC converter, an DC-AC inverter INV and an AC load (grid)/AC-LO all in a cascade or tandem arrangement.

The control circuit consists of several blocks: (shown within dashed lines)

1. the PV array (inputs $i_{sol}$ and $v_{pv}$, output $i_{pv}$)
2. the converter CON with MPPT controller (inputs $i_{pv}$, $v_{dc}$ and $v^*_{pv}$, outputs $i_{dc}$ and $v_{pv}$)
3. a model of the buffer capacitor (inputs $i_{dc}$ and $i_{inv}$, output $v_{dc}$)

4. a predictive controller for the voltage of the buffer capacitor embodying the invention (inputs $i_{dc}$, $v_{dc}$ and $v_{ref}$, output $p_{inv21}$)
5. the inverter INV (inputs $e_{ac}$, $v_{dc}$ and $p_{inv21}$, outputs $i_{inv}$ and $i_{ac}$).

In block 1 the independent parameter is the sunlight here represented by $i_{sol}$. In dependence on the load that the converter CON presents on the input terminals thereof a workpoint ($v_{pv}$, $i_{pv}$) is defined on the relevant characteristic of the PV array. The maximum power point controller MPPT, which may be a state of the art controller has the function to maximize the delivered power $v_{pv} \cdot i_{pv}$. The control parameter therefore is shown as $v^*_{pv}$.

In block 2 is the converter CON the means through which the MPPT controller gets the maximum power out of the PV array and transfers this power to the inverter INV and the buffer capacitor. It is noted that a relative large ripple voltage is present on the buffer capacitor but should have no effect on the input voltage $v_{pv}$ so as not to lower the obtainable maximum power from the PV array. A MPPT controller having sufficient control bandwidth (e.g. $10 \cdot f_{ac}$) can accomplish this.

Block 3 is the representation in blockschematic form of the differential equation connecting the current through and the voltage over the buffer capacitor.

Block 4 is the blockschematic representation of the predictive controller for $v_{dc}$ embodying the invention. On the basis of $i_{dc}$, $v_{dc}$ the output $p_{inv21}$ is so adjusted that the voltage $v_{dc}$ of the capacitor on the sampling time instant fast and accurately follows the desired value $v_{ref}$. From the representation it can simply be derived that $$p_{inv21} = C_{dc}(v^2_{dc} - v^2_{ref})/T_s + v_{dc} \cdot i_{dc},$$

and that this power forward control quantity delayed by block $1/z$ over one sample time interval $T_s$ is supplied to the power control input of inverter INV. This reflects the predictive nature of the operation of the control mechanism, whereby based on a detected error in power such error is compensated for in forward control and directly within one sample time interval.

In block 5 the inverter INV on the basis of $e_{ac}$, $v_{dc}$ and $p_{inv21}$ adjusts the output AC current $I_{ac}$ to the grid to the value that is required to supply the incoming power to the grid system. The inverter can be a state of the art inverter including synchronization to the grid and waveshaping (sinusoid).

The described technique is suitable for any single phase inverter application requiring control of the DC link voltage. This makes it appropriate for grid connected PV systems because it will export all the available PV energy while constraining the DC voltage within a safe operating range. However, it is not limited to PV applications since it is compatible with any source of DC electrical energy which has an unregulated voltage. For AC sources the input DC-DC converter can be preceded by a rectifying stage.

The inverter can operate with bi-directional power flow, so it is suitable for rectifying operation also. Therefore, the technique can be used for mains rectifiers in power supply applications. There is no restriction on the maximum size of the DC capacitor, therefore the voltage ripple and ride-through capability can be set to appropriate levels to suit the application.

The invention claimed is:

1. System for the conversion between direct current (DC) power and alternating current (AC) power comprising a DC link including a buffercapacitor and a controllable converting arrangement for conversion of between AC and DC power in tandem, whereby the controllable converting arrangement is adapted to effect said conversion between the AC and DC power under the control of a power control quantity that is supplied to a power control input thereof, characterized in that said power control quantity in addition to a component which assures a DC-AC power balance between the DC and AC power also comprises a predictive power control component which is indicative of a change in energy that is stored in the buffer capacitor on a sampling time instant in the cycle of the double frequency voltage ripple component on the buffer capacitor compared with a predetermined amount of energy.

2. System according to claim 1 for the conversion of direct current (DC) power into single phase alternating current (AC) power whereby the DC power from a DC source is fed into a DC-AC inverter arrangement through a DC link comprising a buffer capacitor, the inverter arrangement being adapted to produce AC power in a AC load under the control of a power control quantity that is supplied to a power control input thereof, characterized in that said power control quantity in addition to a component which assures a DC-AC power balance between the power delivered by the DC source and the AC power delivered to the AC load also comprises a predictive power control component which is indicative of a change in energy that is stored in the buffer capacitor on a selected sampling time instant in the cycle of the double frequency voltage ripple component on the buffer capacitor compared with a predetermined amount of energy.

3. The system according to claim 2, characterized in that said additional predictive power forward control component can be expressed by:

$$P_{inv21} = P_{dc} - f_{ac} C_{dc}(v_{ref}^2 - V_{dc1}^2)$$

wherein $P_{inv21}$ is the power to the inverter in the sampling period, $P_{dc}$ is the power delivered by the DC source, $f_{ac}$ is the frequency of the AC power that is delivered to the load, $C_{dc}$ is the capacitance of the buffers capacitor, $V_{ref}$ is a reference voltage and $V_{dc1}$ is the voltage an the buffer capacitor on the sampling instant.

4. The system according to claim 1, characterized in that the sampling time instant is selected to be the time instant at which an event occurs from the group of events constituted by the voltage on the buffer capacitor reaching a minimum value, a maximum value and an average value.

* * * * *